United States Patent
Luo et al.

(10) Patent No.: US 7,092,951 B1
(45) Date of Patent: Aug. 15, 2006

(54) AUXILIARY RELATION FOR MATERIALIZED VIEW

(75) Inventors: Gang Luo, Madison, WI (US); Curt J. Ellmann, Madison, WI (US); Jeffrey F. Naughton, Madison, WI (US)

(73) Assignee: NCR Corporation, Dayton, OH (US)

( * ) Notice: Subject to any disclaimer, the term of this patent is extended or adjusted under 35 U.S.C. 154(b) by 408 days.

(21) Appl. No.: 09/900,280

(22) Filed: Jul. 6, 2001

(51) Int. Cl.
G06F 17/30 (2006.01)

(52) U.S. Cl. .................... 707/100; 707/2; 707/104.1; 707/203

(58) Field of Classification Search ........... 707/1–10, 707/100–104.1, 2–3, 5, 200–206; 709/217, 709/219; 715/529
See application file for complete search history.

(56) References Cited

U.S. PATENT DOCUMENTS

| | | | | |
|---|---|---|---|---|
| 5,897,632 | A * | 4/1999 | Dar et al. ................... | 707/2 |
| 6,026,390 | A * | 2/2000 | Ross et al. .................. | 707/2 |
| 6,295,533 | B1 * | 9/2001 | Cohen ........................ | 707/5 |
| 6,339,769 | B1 * | 1/2002 | Cochrane et al. ............ | 707/2 |
| 6,345,272 | B1 * | 2/2002 | Witkowski et al. .......... | 707/4 |
| 6,353,835 | B1 * | 3/2002 | Lieuwen .................... | 707/203 |
| 6,477,534 | B1 * | 11/2002 | Acharya et al. ............ | 707/100 |
| 6,480,836 | B1 * | 11/2002 | Colby et al. ................ | 707/3 |
| 6,484,159 | B1 * | 11/2002 | Mumick et al. ............. | 707/2 |
| 6,493,699 | B1 * | 12/2002 | Colby et al. ................ | 707/2 |
| 6,532,470 | B1 * | 3/2003 | Cochrane et al. ........... | 707/102 |
| 6,594,653 | B1 * | 7/2003 | Colby et al. ................ | 707/3 |
| 6,732,107 | B1 * | 5/2004 | Luo et al. ................... | 707/100 |
| 2003/0093407 | A1 * | 5/2003 | Cochrane et al. ........... | 707/2 |

OTHER PUBLICATIONS

Segev et al., Maintaining materialized views in distributed databases, 1989, IEEE, 262-270.*
Segev et al., Updating Distributed Materialized Views, 1989, IEEE, 173-184.*
Dallan Quass et al., Making View Self-Maintainable for Data Warehousing, 1996, IEEE, 158-169.*
J. Albrecht et al., Supporting Hot Spots with Materialized Views, 2000, Springer-Verlag, 47-56.*
Wilburt J. Labio et al., "Physical Database Design for Data Warehouses," ICDE, pp. 277-288 (1997).
Dallan Quass et al., "Making Views Self-Maintainable for Data Warehousing," PDIS, pp. 158-169 (1996).
Dallan Quass et al., "On-Line Warehouse View Maintenance," SIGMOD, pp. 393-404 (1997).
D. Agrawal et al., "Efficient View Maintenance at Data Warehouses," pp. 417-427 (1997).
Yue Zhuge et al., "The Strobe Algorithms for Multi-Souce Warehouse Consistency," pp. 146-157 (1996).
Patrick Valduriez, "Join Indices," ACM Transactions on Databae Systems, vol. 12, No. 2, pp. 218-246 (Jun. 1987).

(Continued)

Primary Examiner—Shahid Alam
Assistant Examiner—Jean Bolte Fleurantin
(74) Attorney, Agent, or Firm—Trop, Pruner, Hu, PC

(57) ABSTRACT

Auxiliary relations are used to maintain a materialized view. The materialized view comprises results of some operation performed between two or more base relations of a parallel database management system comprising a plurality of nodes. The two or more base relations are distributed to the nodes according to some partitioning strategy. Each auxiliary relation is partitioned according to the join attribute in the materialized view definition. During join or other operations involving the relations, the auxiliary relations, not the base relations, are used to construct join results and to maintain the materialized view.

16 Claims, 12 Drawing Sheets

OTHER PUBLICATIONS

Jennifer Widom, "Research Problems in Data Warehousing," CIKM, pp. 25-30 (1995).

Richard Winter, "B2B Active Warehousing: Data on Demand," Teradata Review Fall 2000, pp. 1-5, printed from http://www.teradatamagazine.com (2000).

Nick Roussopoulos, "Materialized Views and Data Warehouses," SIGMOD Record 27(1), pp. 21-26 (1998).

Kenneth A. Ross et al., "Materialized View Maintenance and Integrity Constraint Checking: Trading Space for Time," SIGMOD, pp. 447-458 (1996).

TPC Benchmark™ R, Standard Specification Revision 2.1.0, pp. 1-144 (1993).

Jose A. Blakeley et al., "Updating Derived Relations: Detecting Irrelevant and Autonomously Computable Updates," ACM Transactions on Database Systems, vol. 14, No. 3, pp. 369-400 (Sep. 1989).

Surajit Chaudhuri et al., "An Overview of Data Warehousing and OLAP Technology," SIGMOD Record 26(1), pp. 65-74 (1997).

Latha S. Colby et al., "Supporting Multiple View Maintenance Policies," SIGMOD, pp. 405-416 (1997).

Venky Harinarayan et al., "Implementing Data Cubes Efficiently," SIGMOD, pp. 205-216 (1996).

H.V. Jagadish et al, "View Maintenance Issues for the Chronicle Data Model," PODS, pp. 113-124 (1995).

\* cited by examiner

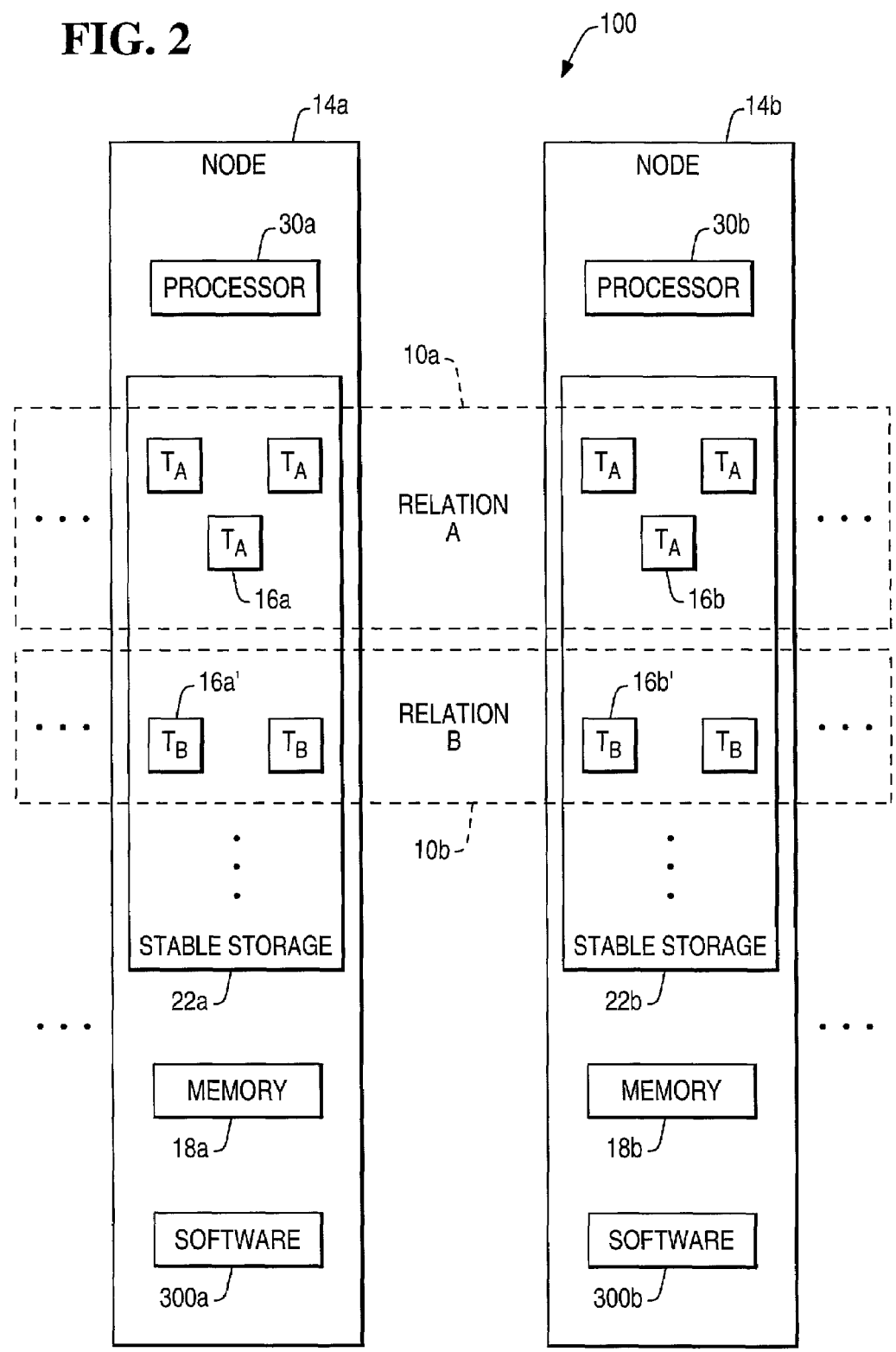

K) JOIN RESULT(S) INSERTED INTO JOIN VIEW JV

I2) $T_A$ JOINED WITH $T_B(S)$ TO PRODUCE JOIN RESULT(S)

I1) $T_A$ STORED IN RELATION A

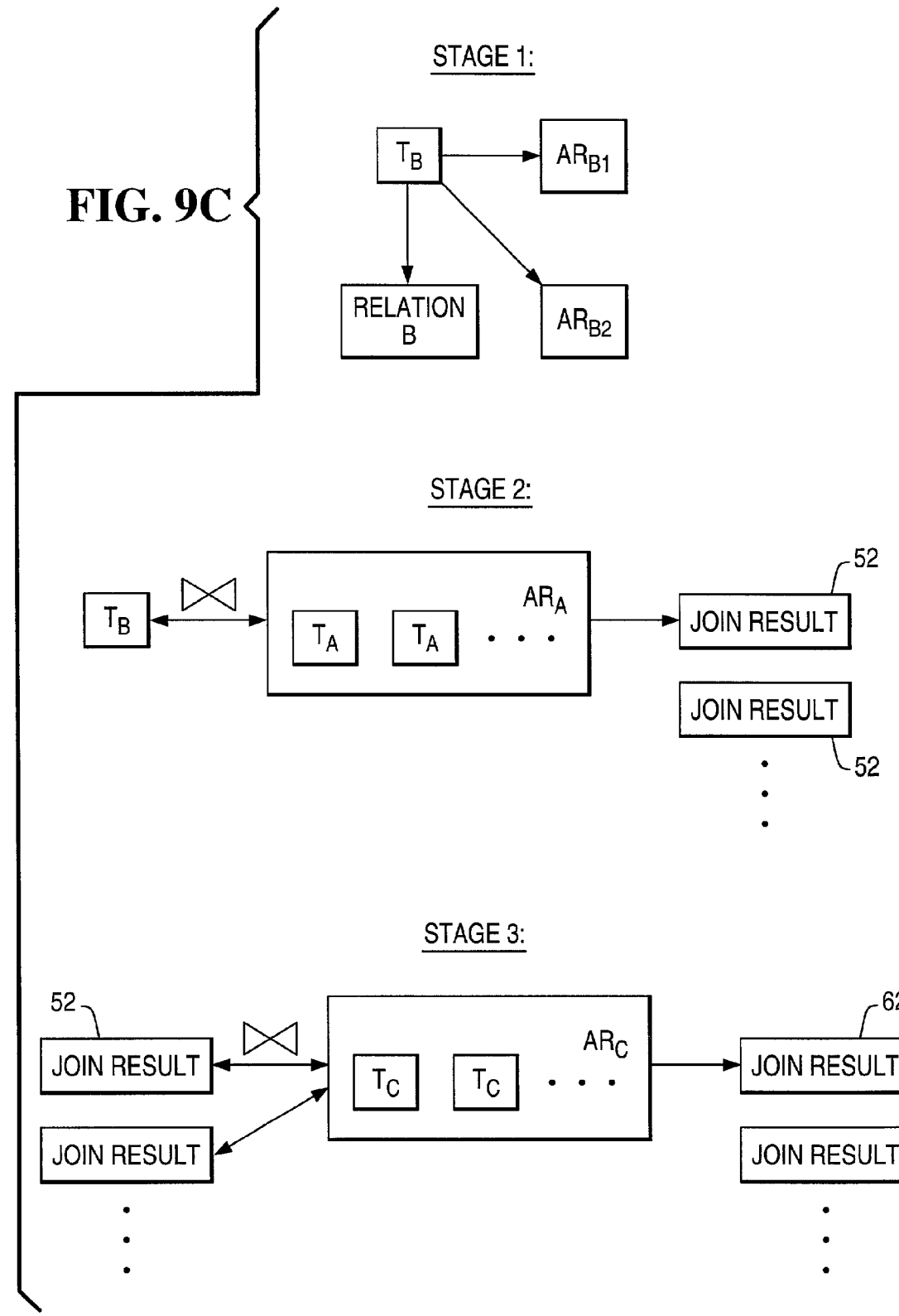

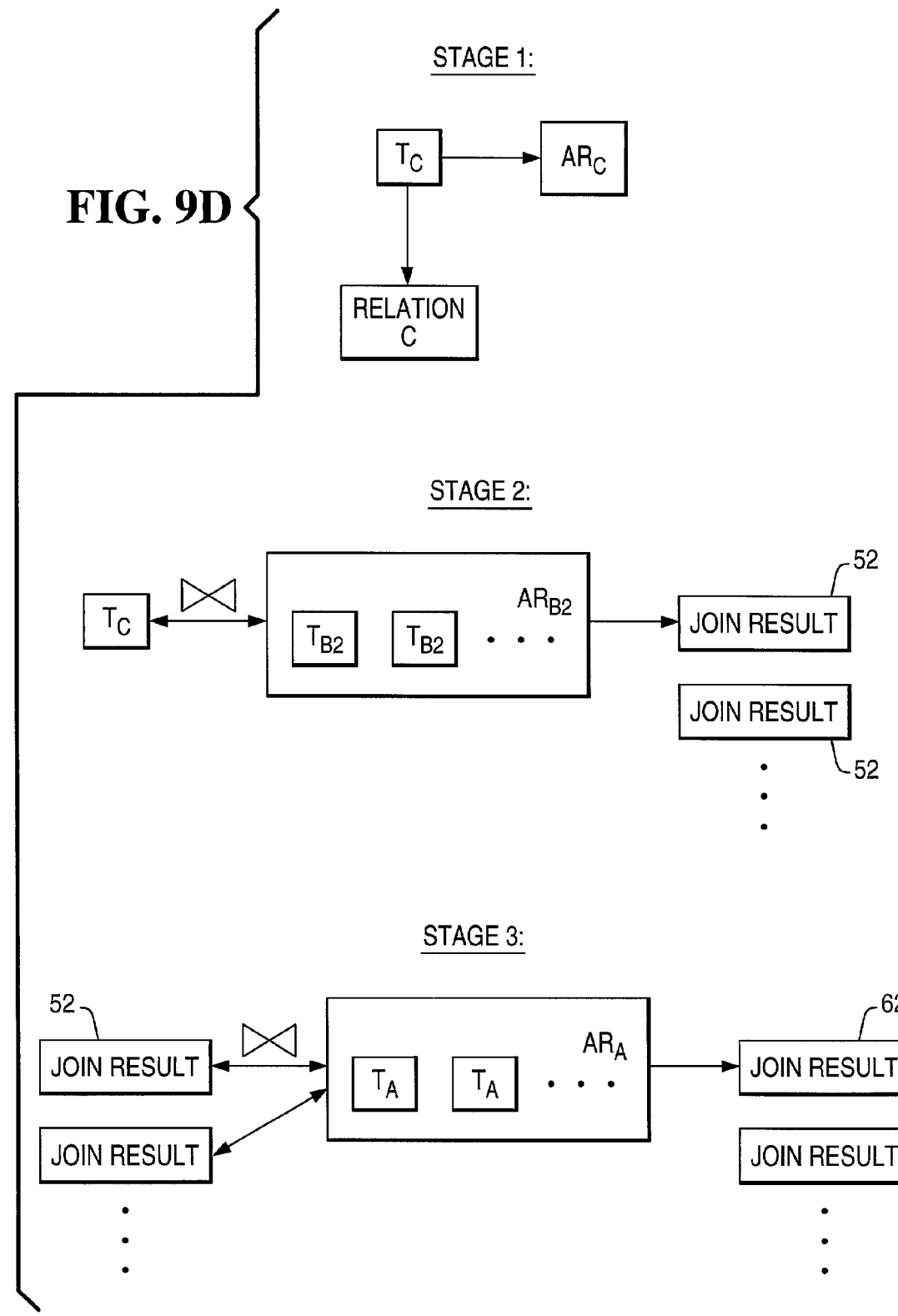

AUXILIARY RELATION FOR MATERIALIZED VIEW

BACKGROUND

A data warehouse collects information from several possibly widely distributed and loosely coupled source databases. The collected information is integrated into a single database to be queried by the data warehouse clients.

Because a data warehouse is primarily used for decision support, queries at the data warehouse tend to be complex and take a long time to execute. Due to the huge volume of data and the complexity of the queries, a data warehouse is typically managed by a parallel database management system (DBMS). In addition to the data itself, the parallel DBMS typically includes data structures of various types that facilitate efficient query processing.

The data itself is organized in tables, also known as relations. Various data structures may be associated with these relations. For example, a view is a derived relation formed by performing a function on one or more base relations. Rather than storing the view, the function is typically recomputed each time the view is referenced.

A materialized view is another type of data structure used to speed up query processing. A materialized view is a pre-computed, stored query result that can be used for some queries instead of reconstructing the results directly from the base relations. As with the view, a function is performed on the base relations to derive the materialized view. Because the materialized view is stored, fast access to the data is possible without recomputing the view.

The materialized view is thus an assembly of data for fast access. After the materialized view is created, subsequent queries may use the materialized view, where appropriate, saving the overhead of performing the computation again. Materialized views may be used to assemble data that come from many different relations, which typically requires many different join operations to be performed between the relations.

Much like a cache, a materialized view is updated when the underlying base relations are modified. A typical materialized view may consist of a join between two or more base relations. The primary copy of the data is kept in the base relations. As these relations are changed through insertion of new tuples, deletion of tuples, or updates to existing tuples, the corresponding rows in the materialized view are changed to avoid becoming stale. This is known as materialized view maintenance.

The maintenance process may be expensive (in terms of resource utilization) on a parallel database management system. It is often the case that the information (tuples) for maintaining the materialized view is not stored together on a single node of the system. Thus, to perform a maintenance operation, the system collects the affected tuples together from several nodes, performs the join, and updates the materialized view. Maintenance of the materialized view may thus adversely affect the speed of query processing.

In a data warehouse environment, updates typically arrive in bulk, rather than a few at a time. Ostensibly, this bulk updating of data improves efficiency of the DBMS. In most commonly used commercial data warehousing systems, the data warehouse is not available for other queries during materialized view maintenance.

As international corporations have branches that span multiple time zones, there is sometimes no convenient "night" down time for the data warehouse to be maintained while blocking query requests. Moreover, in the world of e-commerce, there may be no down time.

Recently, real-time data warehousing has emerged. A real-time data warehouse is event driven, reacts in a timeframe appropriate to the business need, and makes rapid operational decisions or causes prompt operational actions. The real-time data warehouse must be available at all times to provide quick responses to interactive requests. Both updates to base relations and maintenance of materialized views ideally occur at least daily (and often hourly, every ten minutes, or even continuously). For a real-time data warehouse, therefore, materialized views need to be updated without inhibiting queries in progress.

SUMMARY

According to the following embodiments, a method is described in which a tuple is received into a relation at a first node, wherein the tuple comprises a join attribute and the relation is not partitioned according to the join attribute. The tuple is stored in an auxiliary relation at a second node, wherein the auxiliary relation is partitioned according to the join attribute. Second tuples of a second relation are identified from the auxiliary relation of the second relation, joined with the tuple to produce one or more join results, and the join results are stored in a join view.

Other features and embodiments will become apparent from the following description, from the drawings, and from the claims.

BRIEF DESCRIPTION OF THE DRAWINGS

FIG. 2 is a block diagram of a parallel database management system according to one embodiment of the invention;

FIGS. 9A–9D are block diagrams showing how to maintain a materialized view according to one embodiment of the invention.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

In accordance with the following embodiments, a materialized view is maintained by using one or more auxiliary relations in a parallel DBMS. The auxiliary relations are derived from base relations in the parallel DBMS. The auxiliary relations keep track of predetermined "useful" parts (e.g., attributes appearing in the materialized view) of the base relations. Each auxiliary relation is organized to support maintenance of the materialized view. Accordingly, the performance of the maintenance operations may be improved for more efficient query processing.

Perhaps the most widely used materialized view is the join view. A join view stores and maintains the result from a join operation. Joins may be performed on two or more relations. Accordingly, a join view may be generated for multiple base relations.

Consider a join operation between two base relations A and B. An example of a join view JV for relations A and B on join attributes A.c and B.x may be described using the following structured query language (SQL) statement:

create join view JV as
 select *
 from A, B
 where A.c=B.x
 partitioned on A.e;

The SQL statement creates a join view JV from base relations A and B where attributes A.c and B.x are equal. The join view is partitioned on the attribute A.e. When an existing tuple is updated or deleted or a new tuple is inserted into a base relation, the join view JV that is derived from the base relation is also updated.

Figure 1:
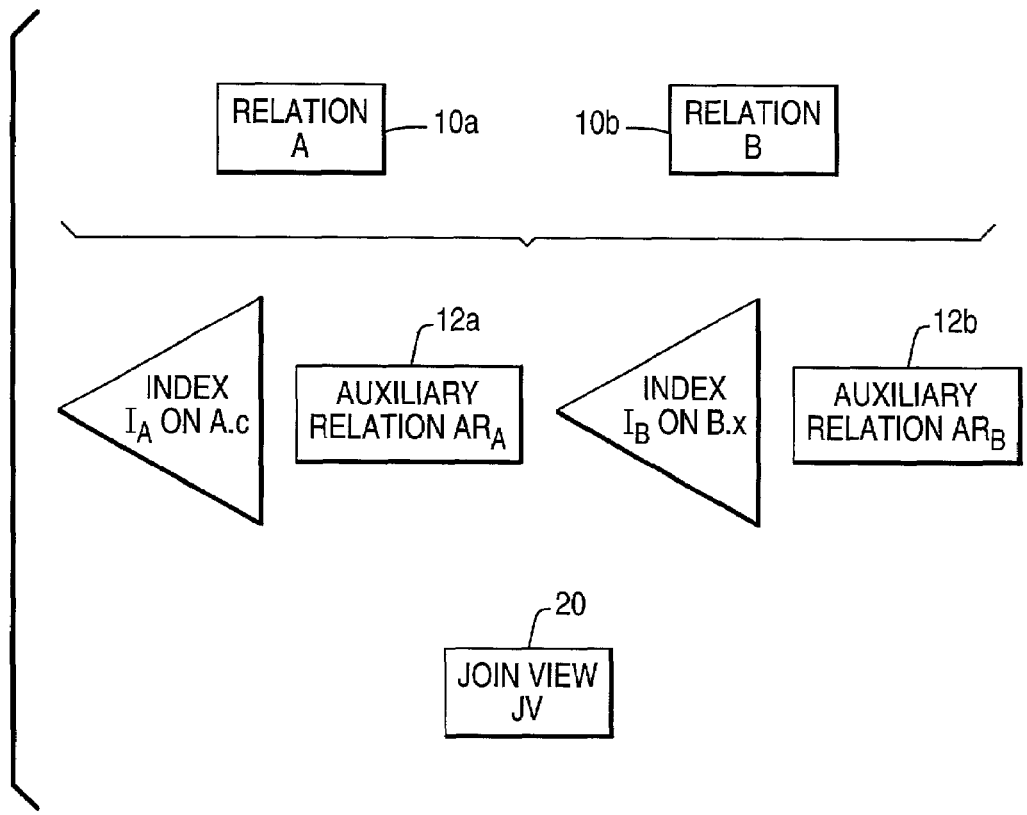
FIG. 1 is a block diagram showing the data structures used for maintenance of a materialized view according to one embodiment of the invention.

In one embodiment, auxiliary relations are used to maintain the join view JV. As depicted in FIG. 1, auxiliary relations $AR_A$ and $AR_B$ are derived from base relations A and B. Additionally, a join view JV is generated from relations A and B, as shown. These data structures are utilized to improve efficiency of query operations involving attributes of relations A and B. Auxiliary relation $AR_A$ is a copy of relation A that is partitioned on the join attribute A.c. Likewise, auxiliary relation $AR_B$ is a copy of relation B that is partitioned on the join attribute B.x. Where relation A (B) is already partitioned on attribute A.c (B.x), no auxiliary relation $AR_A$ ($AR_B$) is generated, according to one embodiment.

Additionally, in one embodiment, an index is maintained on each auxiliary relation. Index $I_A$ is maintained on attribute A.c for auxiliary relation $AR_A$. Likewise, index $I_B$ is maintained on attribute B.x for auxiliary relation $AR_B$. In FIG. 1, the index is depicted as a triangle adjacent to the auxiliary relation upon which the index is maintained.

The auxiliary relations $AR_A$ and $AR_B$ are constructed based on a reorganization of the tuples $T_A$ and $T_B$ of base relations A and B, respectively, in which the join attributes (A.c and B.x) influence the construction. Auxiliary relations $AR_A$ and $AR_B$ thus include all the tuples of relations A and B, respectively, in which the tuples are simply rearranged.

In one embodiment, the data structures of FIG. 1 are maintained in a parallel database management system (DBMS) with L data server nodes (L being greater than one). In FIG. 2, for example, a parallel DBMS 100 includes a plurality of nodes 14, two of which are depicted. Each node 14 includes a processor 30, for executing application programs, such as database management software, a memory 18, and a stable storage 22, such as a hard disk drive or other non-volatile medium. A software program 300 may be executed by the processor 30, and may perform the optimized maintenance of the materialized view, as described below.

In FIG. 2, tuples 16, also known as rows, of relations A and B are distributed across multiple nodes 14 in the system 100. For example, tuples 16a of relation A ($T_A$) are found on one node 14a, while tuples 16b of relation A are found on another node 14b. One of the attributes of tuple $T_A$ is a join attribute.

Likewise, a second relation, called relation B, includes tuples $T_B$, also distributed on multiple nodes 14. One set of tuples 16a' of relation B are on one node 14a while another set of tuples 16b' of relation B are on another node 14b.

Both relations A and B may include additional tuples 16, distributed on additional nodes 14 of the parallel DBMS 100. In one embodiment, the tuples 16 of each relation 10 are distributed, as evenly as possible, across all the nodes 14 of the parallel DBMS 100. In FIG. 2, the tuples $T_A$ and $T_B$ are located in the stable storage 22. During a join or other query processing operation, the tuples may be fetched to the memory 18.

Although not depicted in FIG. 2, auxiliary relations $AR_A$ and $AR_B$, as well as the join view JV (see FIG. 1) may be distributed across the nodes 14 of the parallel DBMS 100. Some tuples $T_{ARA}$ of $AR_A$ may be stored on a first node, for example, while other tuples $T_{ARA}$ are stored on a second node, and so on. Ultimately, the partitioning strategy for the auxiliary relation $AR_A$ determines the node upon which the tuples $T_{ARA}$ are stored.

Figure 3:
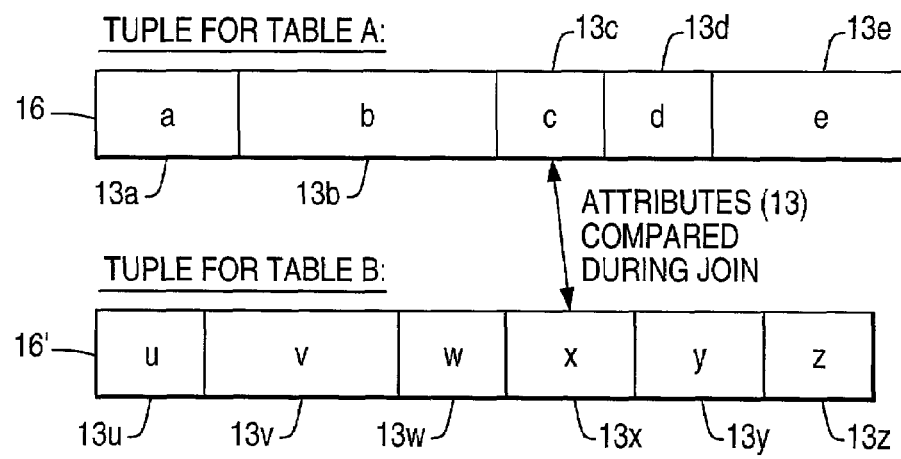
FIG. 3 is a diagram of tuples including attributes according to one embodiment of the invention.

The tuples 16 for relations A and B are illustrated in FIG. 3, according to one example. The tuples for relation A ($T_A$) include several attributes, or columns 13, denoted a, b, c, d, and e. Attribute "d" of relation A is denoted as A.d. The tuple $T_B$ for relation B include similar attributes 13, denoted u, v, w, x, y and z. One or more of these attributes 13 may be join attributes.

Looking back to the join view definition above, tuple $T_A$ of relation A is to be joined with one or more tuples $T_B$ of relation B in which attribute c of $T_A$ equals attribute x of one or more tuples $T_B$. In one embodiment, the join operation is performed using, not relations A and B, but the auxiliary relations $AR_A$ and $AR_B$. Then, the join result tuples are stored in the join view JV.

Recall that join views are recomputed each time a join operation is performed while materialized join views are stored and, thus, not recomputed. However, like a cache, a materialized join view must be maintained to be effective. This means that, as each existing tuple is updated or deleted or as each new tuple is inserted into the parallel DBMS, the materialized view is updated, so as not to become stale. The efficiency of maintenance of the materialized view depends on how the data is organized. Auxiliary relations are used to perform materialized join view maintenance, in accordance with some embodiments. FIGS. 4, 5A, 5B, 6A, and 6B show how materialized view maintenance may be performed without the use of auxiliary relations.

Take, for example, a join view JV, constructed from relations A and B, as in the above SQL statement. If base relations A and B are partitioned on the join attributes A.c and B.x, respectively, performing the join operation is relatively efficient, since tuples $T_A$ whose "c" attributes are equal to the "x" attribute of tuples $T_B$ are stored on the same node 14.

Figure 4:
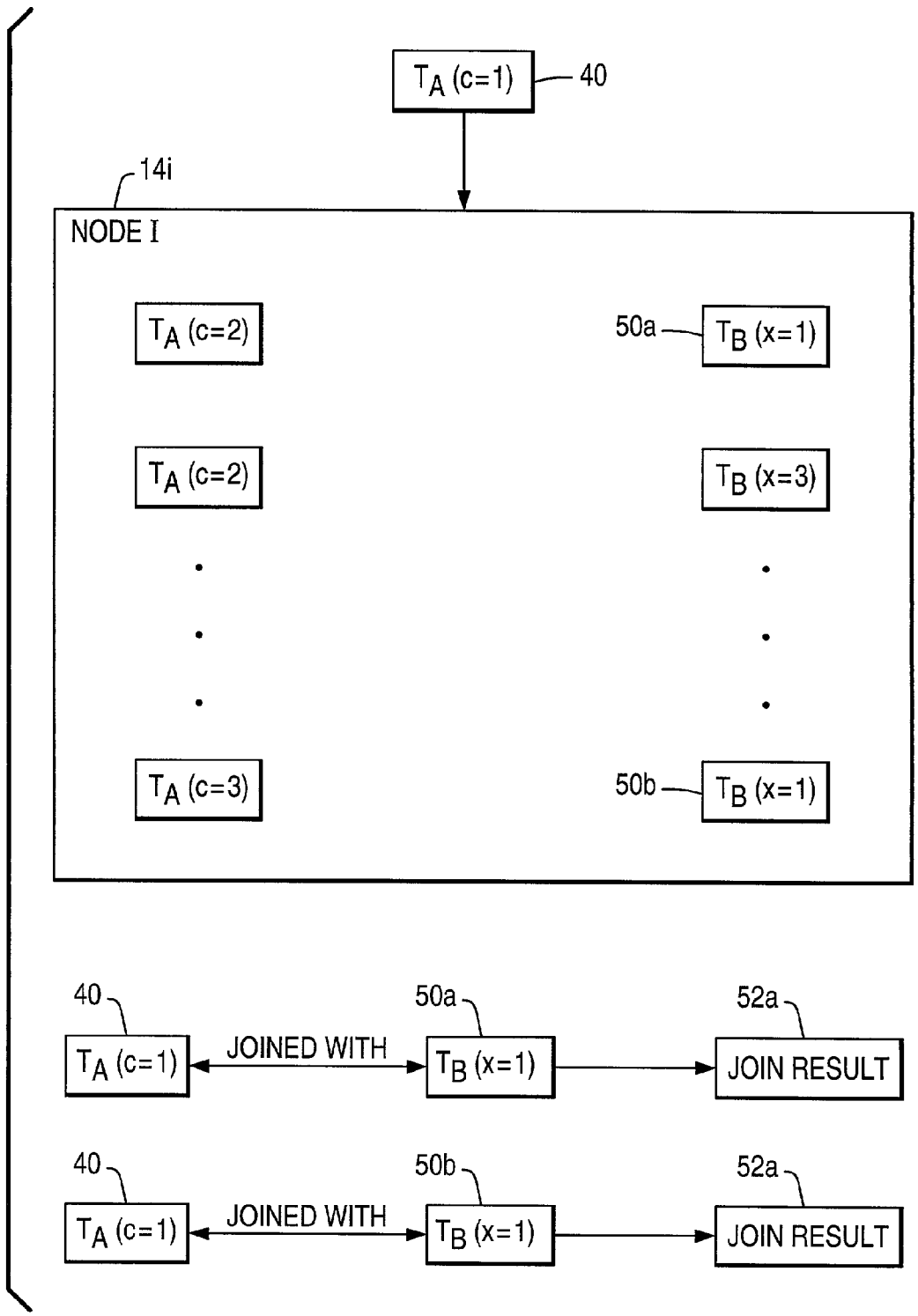
FIG. 4 is a diagram illustrating how tuples are received and joined within a node according to one example.

For example, in FIG. 4, base relations A and B are partitioned on join attributes A.c and B.x, respectively. Assume node i includes tuples $T_A$ in which attribute "c" is between 1 and 5. Also, node i includes tuples $T_B$ in which attribute "x" is between 1 and 5. Tuples $T_A$ and $T_B$, along with the value of attributes "c" and "x," respectively, are shown. Other tuples $T_A$ and $T_B$ of relations A and B are stored at nodes other than node i in the parallel DBMS.

Creating a join view JV according to the above SQL statement is relatively straightforward, since the tuples are stored at node i based upon the join attributes. Incoming tuple $T_A$ 40 may properly be joined with two tuples $T_B$ 50$a$ and 50$b$, as the join attributes for these tuples meet the condition A.c=B.x. Accordingly two join result tuples 52, join result tuple 52$a$ and join result tuple 52$b$, are created.

Where the join view JV is also partitioned according to either attribute "c" of relation A or attribute "x" of relation B, the join result tuples 52 may remain at node i. Where the join view JV is not partitioned on these attributes, however, the appropriate node(s) for the join result tuples 52 is (are) found, and the join result tuples 52 are sent to the appropriate node(s). Join result tuple 52$a$ may be stored at the same node as join result tuple 52$b$ or at a different node.

Thus, depending on how the join view JV is partitioned, one or more nodes may be involved in the join operation, even though relations A and B are partitioned according to the join attributes. If the join view JV is partitioned according to an attribute of relation A, the join result tuples 52 will all go to the same node. If the join view JV is partitioned according to some other strategy, such as according to attributes of relation B, the join result tuples 52 may each end up at different nodes.

The situation is worse when the base relations A and B are not partitioned on the join attributes. Instead of going to a node in which "like" tuples will be present, as depicted in FIG. 4, possibly each node 14 of the parallel DBMS may be accessed, just to find tuples $T_B$ which meet the join criteria of the incoming tuple $T_A$.

Figure 5A:
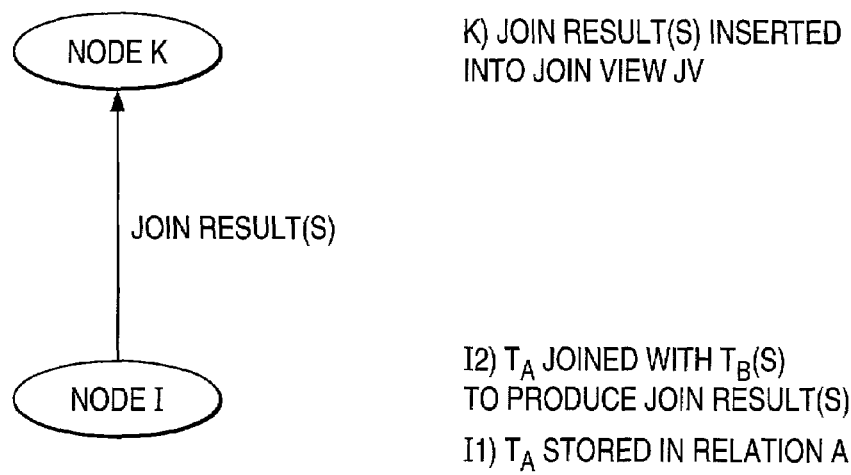
FIGS. 5A and 5B are diagrams illustrating join view maintenance according to one example.
Figure 5B:
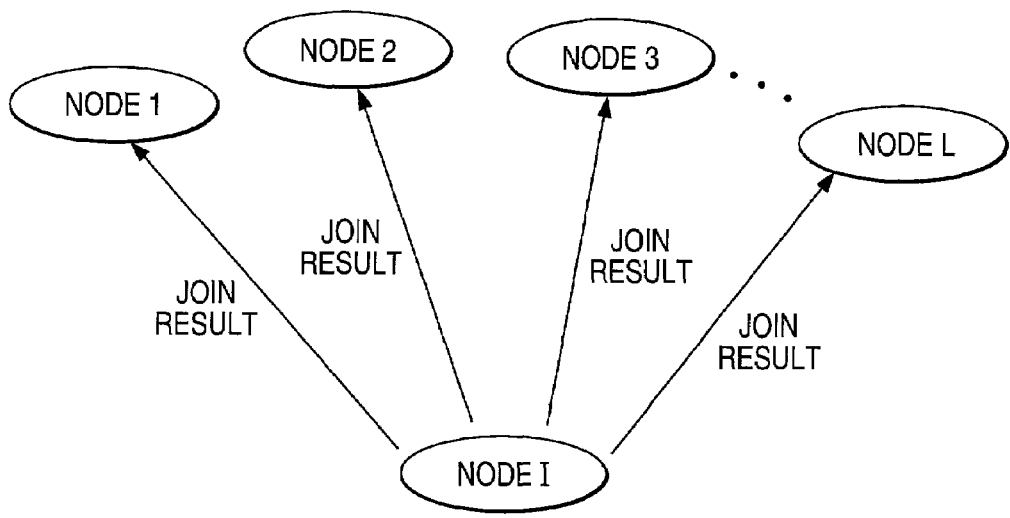

Another way of looking at join view maintenance is illustrated in FIGS. 5A and 5B. As in FIG. 4, the base relations A and B are partitioned on the join attributes A.c and B.x, respectively. In FIG. 5A, the join view JV is partitioned on an attribute of relation A. Incoming tuple $T_A$ is joined with the appropriate tuple or tuples of relation B at node i. The join result tuples (if any) are sent to some node k based on the attribute value of $T_A$, as shown. The join result tuples are inserted into the join view JV there. Node k may be the same as node i.

If, instead, the join view JV is not partitioned on an attribute of relation A, the distribution of join result tuples is depicted in FIG. 5B. Since the join view JV is not partitioned on an attribute of the incoming tuple $T_A$, the join result tuples are distributed to multiple nodes to be inserted into the join view JV there.

Figure 6A:
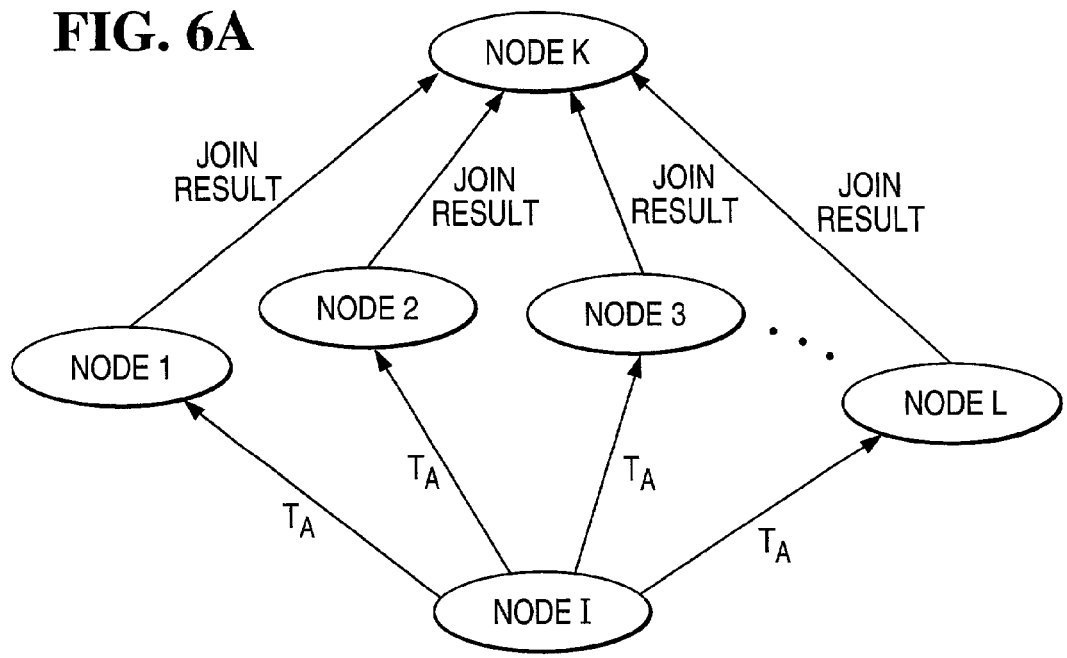
FIGS. 6A and 6B are diagrams illustrating join view maintenance according to a second example.
Figure 6B:
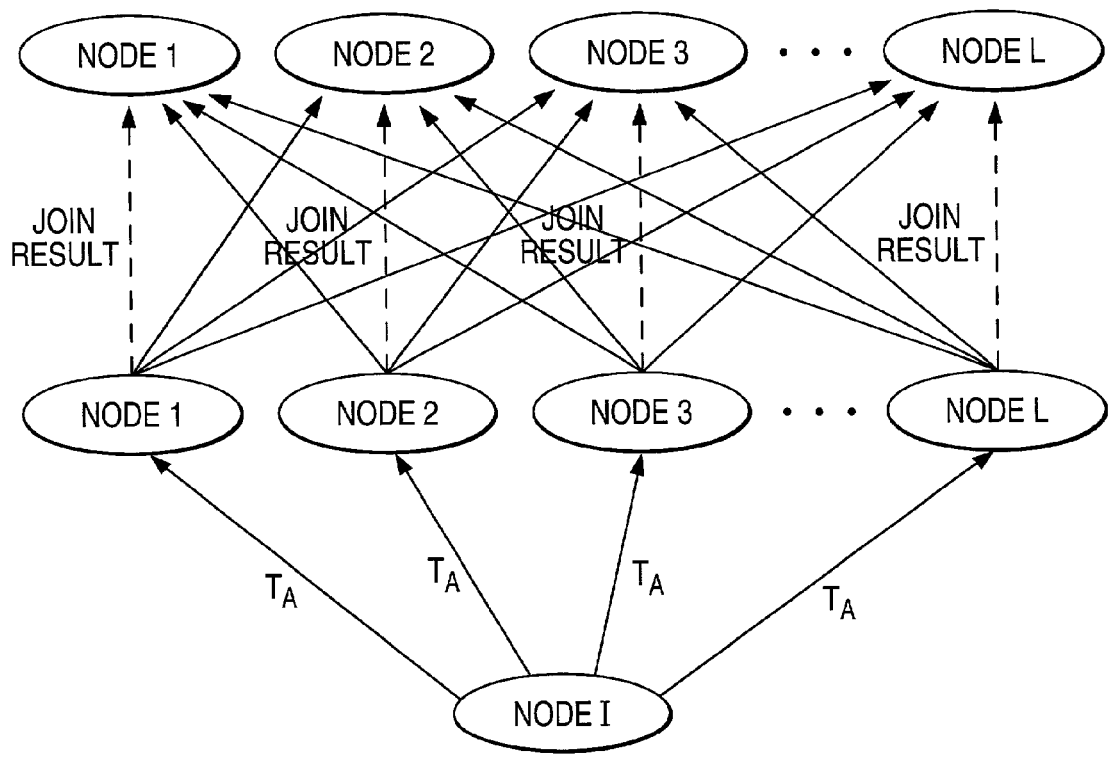

In FIGS. 6A and 6B, maintenance of the join view JV is illustrated where the base relations A and B are partitioned on attributes that are not the join attributes, i.e., not A.c and B.x, respectively. In such a situation, not only are the join result tuples possibly distributed to multiple nodes, but the incoming tuple $T_A$ itself is distributed to all the nodes of the parallel DBMS, to ensure that all possible tuples $T_B$ that meet the join criteria are considered. In FIG. 6A, for example, the join view JV is partitioned on an attribute of A. Tuple $T_A$ is distributed to every node to search for tuples $T_B$ which meet the join criteria (A.c=B.x). The join result tuples (if any) are sent to some node k to be inserted into the join view JV based on the attribute value of $T_A$. Again, node k may be the same as node i.

In FIG. 6B, the join view JV is not partitioned on an attribute of relation A. As in FIG. 6A, the tuple $T_A$ is redistributed to every node to search for the tuples $T_B$ that meet the join condition. The join result tuples, if any, are distributed to multiple nodes to be inserted into the join view JV there. The dashed lines in FIG. 6B indicate that the network communication is conceptual as the message is sent to the same node.

Materialized view maintenance may be inefficient and costly (in terms of system resources) where the base relations A and B are partitioned on attributes that are not join attributes (e.g., FIGS. 6A and 6B), since substantial network communication costs may be incurred. Further, a join operation is performed at every node.

According to one embodiment, auxiliary relations are used to overcome the shortcomings of the join view maintenance techniques described above. In general, an auxiliary relation is maintained for each relation involved in the join operation. For the general case, it is assumed that neither base relation is partitioned on the join attribute. If, however, some base relation is partitioned on the join attribute, the auxiliary relation for that base relation is unnecessary, in one embodiment.

Where a join view JV is maintained from base relations A and B, two auxiliary relations, $AR_A$ for relation A, and $AR_B$ for relation B, are maintained. Relation $AR_A$ is a copy of relation A that is partitioned on the join attribute A.c. Relation $AR_B$ is a copy of relation B that is partitioned on the join attribute B.x. Additionally, as depicted in FIG. 1, index $I_A$ on attribute c of relation A is maintained for auxiliary relation $AR_A$. Likewise, index $I_B$ on attribute x of relation B is maintained for auxiliary relation $AR_B$.

By maintaining auxiliary relations $AR_A$ and $AR_B$ for relations A and B, respectively, assurance can be made that, at any node i of the parallel DBMS 100, tuples $T_A$ coexist with tuples $T_B$ in which the join attributes are of the same value (see FIG. 4). In other words, where the tuples $T_A$ and $T_B$ of relations A and B are not organized such that tuples meeting the condition A.c=B.x coexist at the same node, such a condition may nevertheless be provided using tuples $T_A$ and $T_B$ of auxiliary relations $AR_A$ and $AR_B$.

Figure 7A:
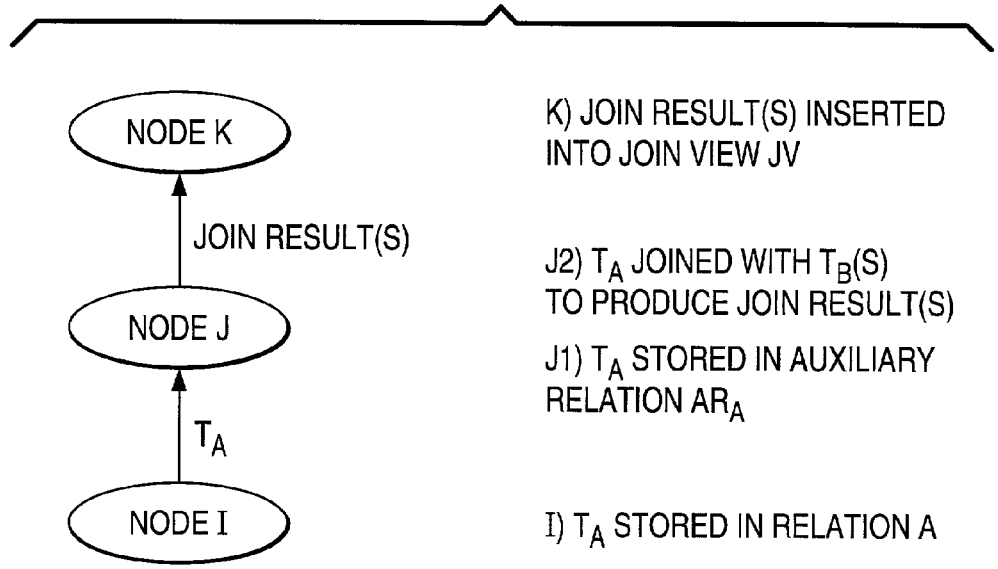
FIGS. 7A and 7B are diagrams illustrating maintenance of a materialized view according to one embodiment of the invention.
Figure 7B:
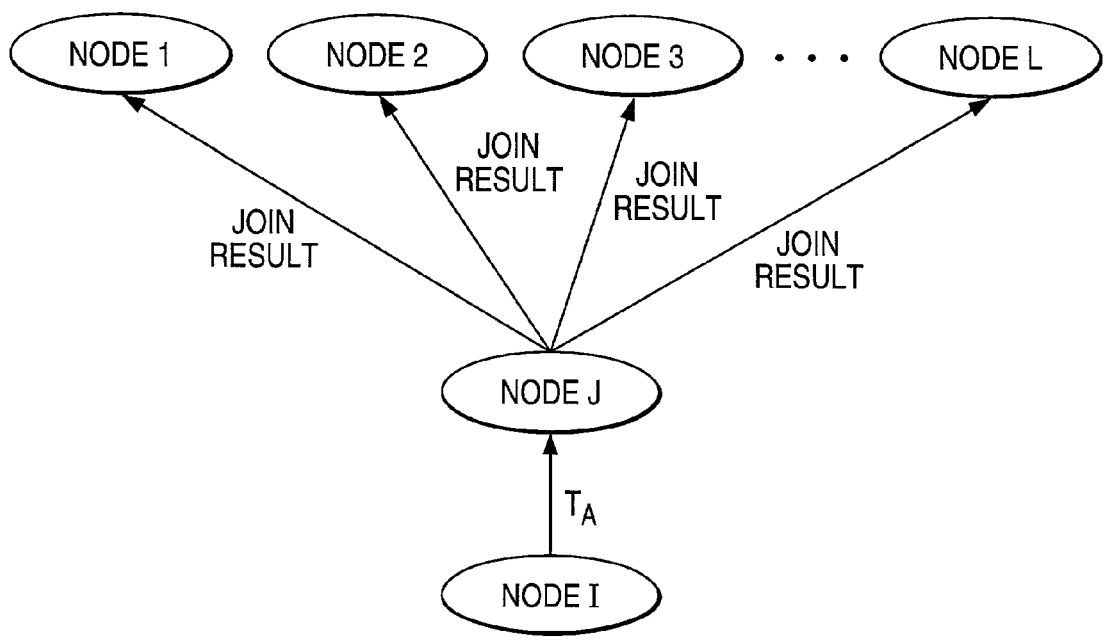

One procedure for maintaining a join view using auxiliary relations is depicted in FIGS. 7A and 7B, according to one embodiment. When a tuple $T_A$ is inserted into relation A at node i, the tuple is also redistributed to a specific node j, based on the join attribute value A.c of the tuple. Node j may be the same as node i. Tuple $T_A$ is inserted into the auxiliary relation $AR_A$ at node j. At node j, $T_A$ is joined with the appropriate tuples $T_B$ in the auxiliary relation $AR_B$, where the auxiliary relation $AR_B$ utilizes the index $I_B$ to quickly obtain the appropriate tuples $T_B$.

In FIG. 7A, the join view JV is partitioned on an attribute of A. Thus, it is possible that the join result is stored on the same node as $T_A$. The join result tuples (if any) are sent to some node k to be inserted into the join view JV based on the attribute value of $T_A$. Node k may be the same as node j.

In FIG. 7B, the join view JV is not partitioned on an attribute of A. Accordingly, the join result tuples (if any) are distributed to multiple nodes to be inserted into the join view JV there. For example, each join result may be sent to a different node in the parallel DBMS 100.

Figure 8:
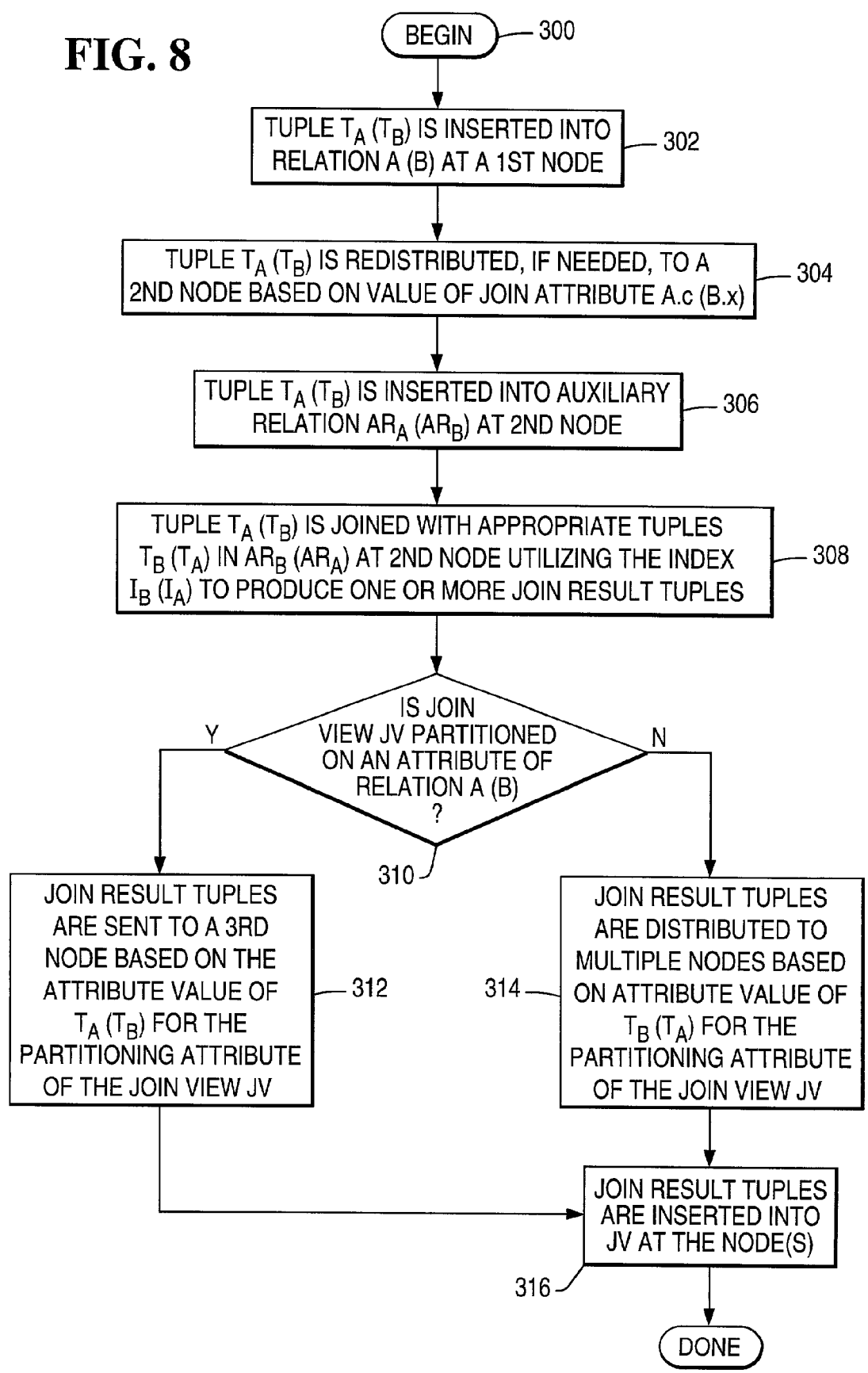
FIG. 8 is a flow diagram illustrating the operations of FIGS. 7A and 7B according to one embodiment of the invention.

The operations of FIGS. 7A and 7B are depicted in the flow diagram of FIG. 8. As a tuple is received into the parallel DBMS 100, the tuple is inserted into the appropriate base relation at a first node (block 302). Tuple $T_A$ ($T_B$) is received into base relation A (B), for example. The tuple $T_A$ ($T_B$) is then inserted into the appropriate auxiliary relation $AR_A$ ($AR_B$), based upon the join attribute value (A.c or B.x)

(block 304). This second copy of the tuple is stored at a second node selected according to the join attribute.

In one embodiment, tuple $T_A$ ($T_B$) is then joined with the appropriate tuples $T_B$ ($T_A$) in $AR_B$ ($AR_A$) at the second node (block 306). The join operation utilizes the index $I_B$ ($I_A$) to quickly obtain tuples (block 306) that meet the join condition.

Subsequent operations depend on whether the join view JV is partitioned on an attribute of base relation A (B) or not (diamond 308). If so, join result tuples are sent to a third node based on the attribute value of $T_A$ ($T_B$) (block 310). There, the join result tuples are inserted into the join view JV (block 314).

Where the join view JV is not partitioned on an attribute of base relation A (B), the join result tuples are distributed to multiple nodes based on the attribute value of the partitioning attribute of the join view JV (block 312). At each node to which the join result tuples are distributed, the join result tuples are inserted into the join view JV (block 314). The auxiliary relation method for maintaining the join view is thus complete, according to one embodiment.

The operations of FIG. 8 illustrate the case when a tuple $T_A$ is inserted into base relation A. Operations in which tuple $T_A$ is deleted from base relation A or updated in base relation A are similarly performed. Also, when a tuple $T_B$ is inserted into, deleted from, or updated in base relation B, analogous operations are performed, according to one embodiment.

By using one or more auxiliary relations, the join view may be maintained more efficiently. In one embodiment, network communication is reduced. For each inserted (updated, deleted) tuple of base relation A, the join work to be done occurs at one node rather than at every node of the parallel DBMS 100. Further, for each inserted (updated, deleted) tuple of base relation A, the auxiliary relation $AR_B$ at one node (rather than at all nodes) is locked when performing the join operation. In one embodiment, this improves accessibility to the base relation B while join view maintenance is being performed.

Although creating and updating auxiliary relations in accordance with some embodiments results in extra work by the database system, the benefits they provide for maintaining materialized join views outweigh the costs.

Minimizing Storage Overhead

In one embodiment, the storage overhead for each auxiliary relation may be kept relatively small in many cases. For example, if a join view has some selection condition on the base relation A in the where clause, such as:
   create join view JV as
   select *
   from A, B
   where A.c=B.x and A.e=3;

only those tuples of A that satisfy the selection condition (A.e=3) need be maintained in the auxiliary relation $AR_A$.

As another example, if a join view does not contain all attributes of the base relation A, such as:
   create join view JV as
   select A.e, B.z
   from A, B
   where A.c=B.x;

The auxiliary relation $AR_A$ may maintain fewer than all the attributes of relation A. In the above example, the auxiliary relation $AR_A$ may maintain only the join attribute and the attributes appearing in the select clause (A.e). Accordingly, $AR_A$ would include attributes c and e of base relation A.

Another example involves the join condition in the join view that is based on key and referential integrity restraints, such as:
   create join view JV as
   select *
   from A, B
   where A.c=B.x;

where A.c is a key of relation A and B.x is a foreign key of relation B that references to A.c. If a tuple $T_A$ is inserted into relation A, there is no matching tuple in relation B that can be joined with $T_A$. However, if a tuple $T_B$ is inserted into relation B, there must be a tuple of relation A that can be joined with it. The case for deletion is similar. Thus, in one embodiment, if only insertion and deletion in the base relations is considered, only the auxiliary relation $AR_A$ is maintained. There is no need for auxiliary relation $AR_B$.

On the other hand, if a tuple $T_A$ of relation A is updated on a non-join attribute, to maintain the join view JV, tuple $T_A$ is joined with the appropriate tuples in the base relation B. In such an instance, the auxiliary relation $AR_B$ is helpful.

This example illustrates a dual use of the auxiliary relation. First, where the base relations are not partitioned on the join attributes, the auxiliary relations enable matching tuples satisfying the join criteria to reside on a single node. Using the auxiliary relation, the join operation may be more efficiently performed.

Second, the auxiliary relations are used to maintain the join view. Where, for example, the join condition in the join view is based on key and referential integrity restraints, as described above, only a partial benefit is obtained if one of the auxiliary relations is not generated.

In other words, a tradeoff exists between generating or not generating the auxiliary relation during the existence of the key and referential integrity constraints. If auxiliary relation $AR_B$ is not maintained, storage overhead is clearly saved. However, maintaining the join view JV will be costly in the case of an update in base relation A. If we keep the auxiliary relation $AR_B$, maintaining the join view JV will be efficient, but $AR_B$ consumes some storage overhead.

In a data warehousing environment, it is common for certain base relations not to be updated. In such relations, tuples are either inserted or deleted from the base relations, e.g., the dimension tables of a star join. In one embodiment, to save storage overhead, auxiliary relation $AR_B$ is not maintained in a data warehousing environment.

Join View on Multiple Base Relations

In one embodiment, the auxiliary relation method for maintaining the materialized view may operate where the join view is defined on multiple base relations. Consider a join view that is defined on multiple base relations. If a base relation T is joined with multiple base relations $R_1, R_2, \ldots, R_m$ in the join view definition, in one embodiment, an auxiliary relation of T is maintained for each $R_i (1 \leq i \leq m)$ that is partitioned on the join attribute between T and $R_i$ ($1 \leq i \leq m$).

For example, consider the following chain join:
$$R_1 \bowtie R_2 \bowtie R_3 \bowtie \ldots \bowtie R_n$$

where "$\bowtie$" means "joins with." For $R_1$, an auxiliary relation is maintained that is partitioned on the join attribute of $R_1 \bowtie R_2$, in one embodiment. For $R_i (2 \leq i \leq n)$, two auxiliary relations are maintained, one partitioned on the join attribute of $R_{i-1} \bowtie R_i$ and the other partitioned on the join attribute of $R_i \bowtie R_{i+1}$. For $R_n$, an auxiliary relation that is partitioned on the join attribute of $R_{n-1} \bowtie R_n$ is maintained, in one embodiment.

However, it is possible that the number of auxiliary relations to be maintained is less than the above general case. For example, where the join conditions are between a key of $R_i$ and a foreign key of $R_{i+1}$ that references to $R_i$ ($1 \leq i \leq n$), a single auxiliary relation is maintained for each $R_i(1 \leq i \leq n)$ that is partitioned on the join attribute of $R_i \bowtie R^{i+1}$ (rather than two auxiliary relations, one partitioned on the join attribute of $R_{i-1} \bowtie R_i$ and another partitioned on the join attribute of $R_i \bowtie R_{i+1}$), according to one embodiment.

As another example, consider a star join where a large fact table is joined with a set of small dimension tables. A star join is a join of tables in a star schema. A star schema includes several dimension tables and a fact table. The fact table includes foreign keys that reference to primary keys of the dimension tables. In one embodiment, auxiliary relations for the fact table are not maintained, but only kept for each dimension table that is partitioned on the primary key.

Detecting Unnecessary Updates

Certain updates to the base relations will not cause the join view to change. In one embodiment, the system 100 detects these updates, such that unnecessary processing of the join view may be avoided.

Take, for example, a join view defined on base relations $R_1, R_2, \ldots,$ and $R_n$, in which base relation $R_i$ is being updated. Consider each relation $R_k$ that is joined with $R_i$ in the join view definition. If the join condition of $R_i \bowtie R_k$ is between the key of $R_i$ and the foreign key of $R_k$ that references to $R_i$, then insertions, deletions, and updates that change the join attribute of $R_i \bowtie R_k$ do not cause the join view to be changed.

For example, suppose base relation A is updated and JV is defined as follows:

create join view JV as
select *
from A, B
where A.c=B.x;

where A.c is a key of relation A and B.x is a foreign key of relation B that references to A.c. In one embodiment, for base relation A, insertions, deletions, and updates that change the attribute value of A.c do not cause the join view JV to be changed.

As another example, insertions, deletions, and updates to a base table that do not satisfy the selection condition in the where clause of the join view definition do not cause the join view to be changed, according to one embodiment. For example, suppose base relation A is updated and the join view JV is defined as follows:

create join view JV as
select *
from A, B
where A.c=B.x and A.e=3;

For base relation A, insertions, deletions, and updates that do not satisfy the condition A.e=3 do not cause the join view JV to be updated, in one embodiment.

Implementing the Auxiliary Relation Method

Where a join view JV is defined on base relations $R_1, R_2, \ldots,$ and $R_n$, the system 100 determines the configuration of auxiliary relations that may be utilized to both compute join results and maintain the join view.

In one embodiment, for each base relation $R_k$ that is joined with $R_i$ in the join view definition (e.g., $JV= \ldots R_i \bowtie R_k \ldots$), if $R_i$ is not partitioned on the join attribute of $R_i \bowtie R_k$, according to one embodiment, an auxiliary relation of $R_i$ that is partitioned on the join attribute of $R_i \bowtie R_k$ is maintained.

Additionally, techniques already described to minimize storage overhead of the auxiliary relations may be employed. For example, unnecessary attributes are not stored in the auxiliary relations, in one embodiment. Tuples that do not satisfy the selection condition in the join view definition (e.g., A.e=3 in the example above) are not stored in the auxiliary relations. Finally, for those operations in which key and referential integrity constraints exist, maintenance of one or more auxiliary relations may be avoided, in some embodiments.

When a base relation $R_i(1 \leq i \leq n)$ is updated, certain operations may be performed to maintain the join view. For example in one embodiment, all the auxiliary relations of $R_i$ are likewise updated. Further, unnecessary updates are avoided, where possible.

To detect unnecessary updates, assume that S is the set of all updates to $R_i$. Using the techniques described in the section, "Detecting Unnecessary Updates," above, unnecessary updates are removed from S. If S is empty, the join view will not be changed, in one embodiment. Otherwise, for each base relation, $R_j (j \neq i, 1 \leq j \leq n)$, the following operations are performed.

First, a proper auxiliary relation of $R_j$ (or $R_j$ itself) is determined, based on the join conditions. Changes to the join view are also computed according to the updates to $R_i$ that are still left in the set S and the auxiliary (base) relation of $R_j$. Finally, the join view is updated.

For example, a join view JV may be defined on three base relations, A, B, and C, as follows:

$$JV = A \bowtie B \bowtie C$$

Without loss of generality, assume that the base relations A, B, and C are not partitioned on the join attributes. Also assume that no technique is available for reducing the storage overhead of auxiliary relations.

Figure 9A:
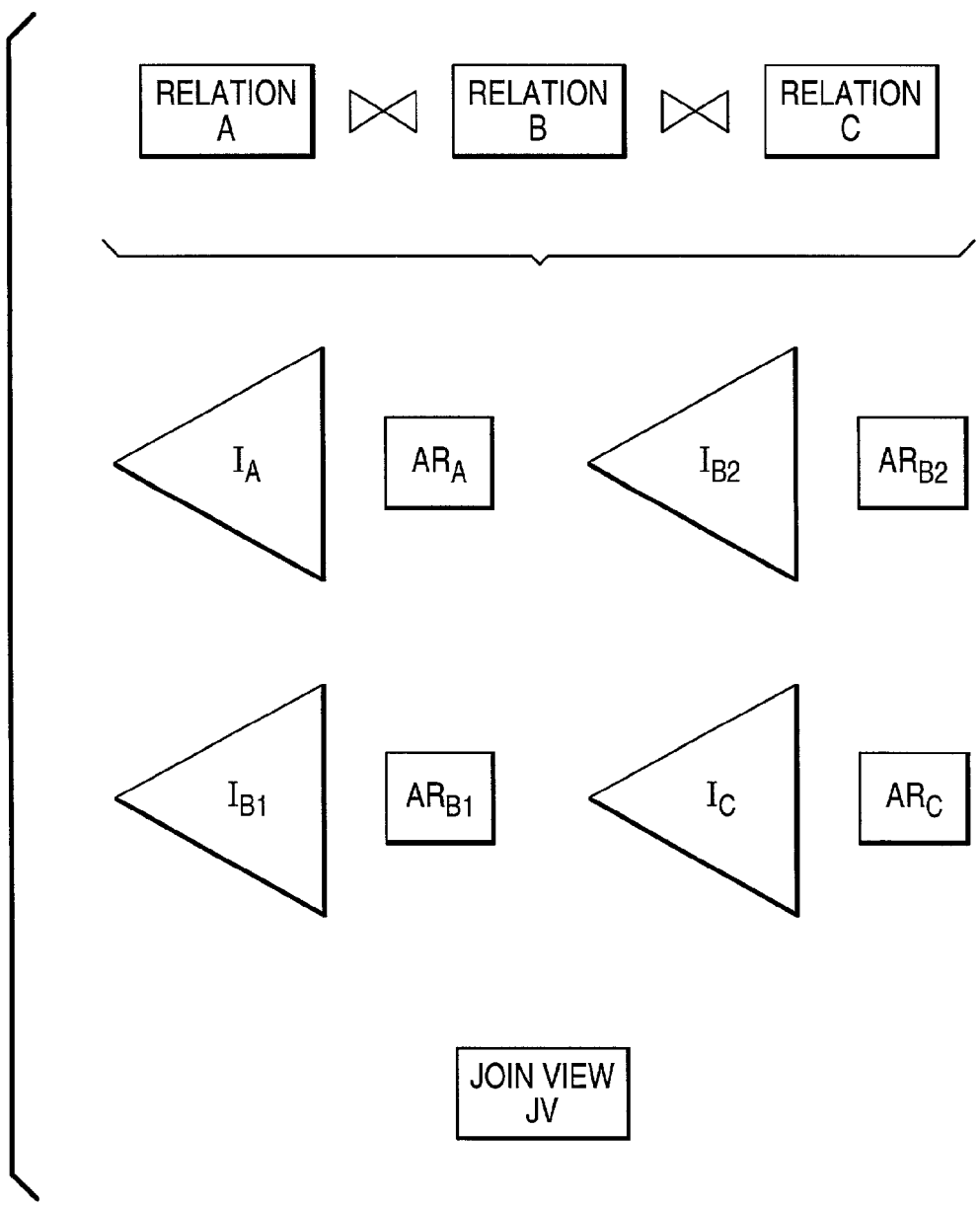

In one embodiment, the following auxiliary relations are maintained:

(1) $AR_A$ for relation A that is partitioned on the join attribute of $A \bowtie B$;

(2) $AR_{B1}$ for relation B that is partitioned on the join attribute of $A \bowtie B$;

(3) $AR_{B2}$ for relation B that is partitioned on the join attribute of $B \bowtie C$;

(4) $AR_C$ for relation C that is partitioned on the join attribute of $B \bowtie C$;

These data structures are depicted in FIG. 9A, according to one embodiment. Each auxiliary relation $AR_x$ is indexed by index $I_x$. $AR_A$ and $AR_{B1}$ are partitioned on the join attributes of $A \bowtie B$. $AR_{B2}$ and $AR_C$ are partitioned on the join attributes of $B \bowtie C$.

Figure 9B:
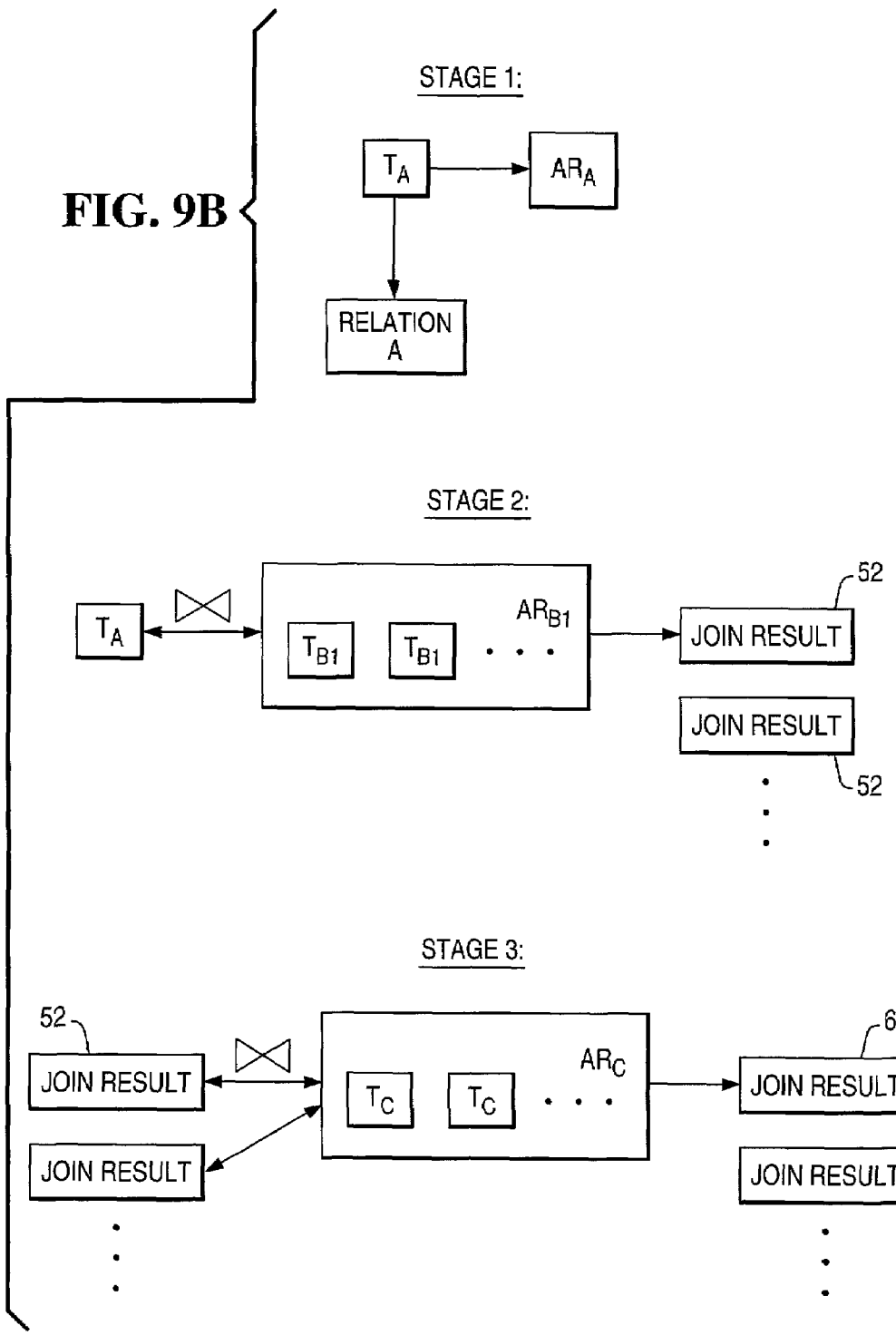

To maintain join view JV when a base relation is updated, three possibilities exist: base relation A is updated, base relation B is updated, or base relation C is updated. If a tuple $T_A$ is inserted into base relation A, the data structures of FIG. 9A are updated as depicted in FIG. 9B, according to one embodiment. In a first stage, incoming tuple $T_A$ is stored in relation A as well as in auxiliary relation $AR_A$. Storing the tuple $T_A$ at relation A may occur at one node while storing the tuple $T_A$ in the auxiliary relation $AR_A$ may occur at a second node, in one embodiment.

In a second stage, the tuple $T_A$ is joined with one or more tuples $T_{B1}$ from auxiliary relation $AR_{B1}$, to produce one or more join result tuples 52. Since both $AR_A$ and $AR_{B1}$ are partitioned on the join attributes of A⋈B, stage 2 may be performed at the same node where tuple $T_A$ was stored in $AR_A$.

At a third stage, the one or more join result tuples 52 are then joined with tuples $T_C$ of auxiliary relation $AR_C$, according to one embodiment. Since $AR_C$ is partitioned on the join attribute of B⋈C, for each join result tuple 52, the third stage may occur at a different node, in one embodiment, than the second stage.

If base relation B is updated with one or more tuples $T_B$, tuples $T_B$ are likewise propagated to the auxiliary relations $AR_{B1}$ and $AR_{B2}$, according to one embodiment. $AR_A$ and $AR_C$ are used to maintain the join view JV.

Upon receiving a tuple $T_B$, the data structures of FIG. 9A are updated as depicted in FIG. 9C, according to one embodiment. Incoming tuple $T_B$ is received into relation B, then is propagated to both the auxiliary relations $AR_{B1}$ and $AR_{B2}$, as shown in a first stage. Since auxiliary relations $AR_{B1}$ and $AR_{B2}$ are partitioned differently, it is possible that three different nodes are accessed, just to store the tuple $T_B$ in relation B, $AR_{B1}$, and $AR_{B2}$.

In a second stage, tuple $T_B$ is joined with one or more tuples $T_A$ from auxiliary relation $AR_A$ to produce one or more join result tuples 52. Since $AR_A$ and $AR_{B1}$ are partitioned according to the same criteria (join attributes of A⋈B), the operations of stage 2 are performed on the node where $T_B$ was stored in $AR_{B1}$, in one embodiment.

In a third stage, the one or more join result tuples 52 are joined with one or more tuples $T_C$ in $AR_C$, as illustrated in FIG. 9C. Since $AR_{B2}$ and $AR_C$ are partitioned according to the same criteria (join attributes of B⋈C), the operations of stage 3 are performed on the node where $T_B$ was stored in $AR_{B2}$, in one embodiment.

Upon receiving a tuple $T_C$, the data structures of FIG. 9A are updated as depicted in FIG. 9D, according to one embodiment. Incoming tuple $T_C$ is received into relation C, then is propagated to the auxiliary relation $AR_C$, as shown in a first stage. Storing the tuple $T_C$ at relation C may occur at one node while storing the tuple $T_C$ in the auxiliary relation $AR_C$ may occur at a second node, in one embodiment.

In a second stage, the tuple $T_C$ is joined with one or more tuples $T_B$ from auxiliary relation $AR_{B2}$, to produce one or more join result tuples 52. Since both $AR_{B2}$ and $AR_C$ are partitioned on the join attributes of B⋈C, stage 2 may be performed at the same node where tuple $T_C$ was stored in $AR_C$.

At a third stage, the one or more join result tuples 52 are then joined with tuples $T_A$ of auxiliary relation $AR_A$, according to one embodiment. Since $AR_A$ is partitioned on the join attribute of A⋈B, for each join result tuple 52, the third stage may occur at a different node, in one embodiment, than the second stage.

If the join condition includes one of the special cases described above, it is possible that fewer of the auxiliary relations may be used. Also, the storage overhead of the auxiliary relations may be reduced, in some embodiments.

For example, if the join condition of A⋈B (B⋈C) is between a key of relation A (B) and a foreign key of relation B (C) that references to relation A (B), in one embodiment, the following auxiliary relations are maintained:

(1) $AR_A$ for relation A that is partitioned on the join attribute of A⋈B;

(2) $AR_B$ for relation B that is partitioned on the join attribute of B⋈C;

If tuples are inserted into or deleted from the base relation A (B), auxiliary relations $AR_A$ and $AR_B$ are updated and the join view JV remains unchanged. If tuples are inserted into or deleted from the base relation C, according to one embodiment, auxiliary relations $AR_A$ and $AR_B$ may be used to maintain the join view JV.

Additionally, the auxiliary relation method described herein may be implemented for a join view that is defined in the complete join of base relations A, B, and C. A complete join is one in which each of the base relations is joined with each of the other base relations. An equation for a complete join for base relations A, B, and C may look as follows:

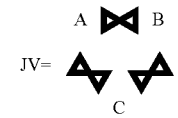

Figure 10:
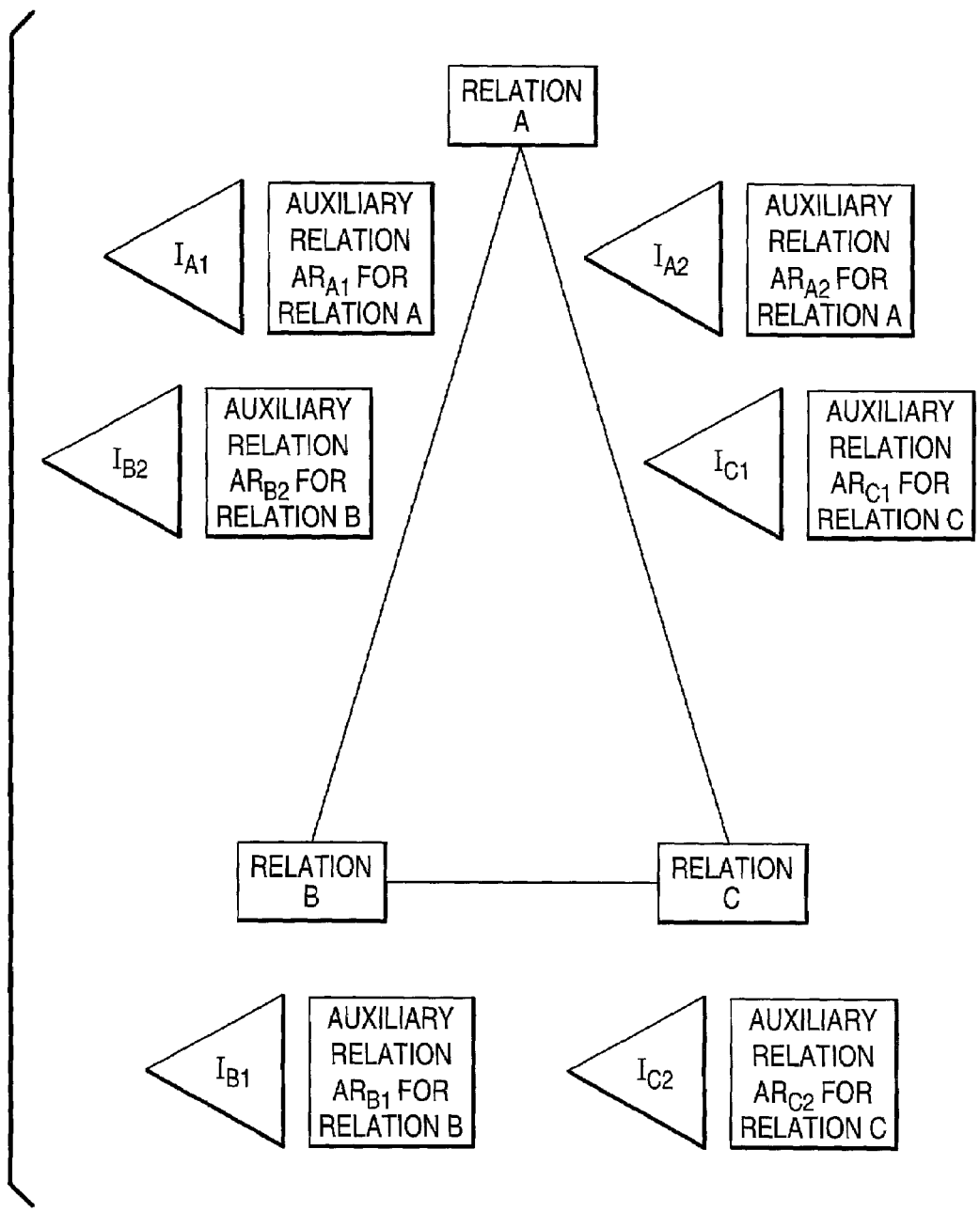
FIG. 10 is a block diagram illustrating the data structures used to maintain a materialized view for a complete join operation according to one embodiment of the invention.

Notice that relation A is joined with both relations B and C, whereas, in the previous example, relation A is only joined with relation B, not with relation C.

Where a complete join of relations A, B, and C is performed, six auxiliary relations, as depicted in FIG. 10, are maintained, according to one embodiment, as follows:

(1) $AR_{A1}$ for relation A that is partitioned on the join attribute of A⋈B (2) $AR_{B2}$ for relation B that is partitioned on the join attribute of A⋈B (3) $AR_{B1}$ for relation B that is partitioned on the join attribute of B⋈C (4) $AR_{C2}$ for relation C that is partitioned on the join attribute of B⋈C (5) $AR_{C1}$ for relation C that is partitioned on the join attribute of C⋈A (6) $AR_{A2}$ for relation A that is partitioned on the join attribute of C⋈A If a tuple $T_A$ is inserted into the base relation A, there are four possible ways to compute the corresponding changes to the join view JV, according to one embodiment:

(1) $T_A$ is joined with $AR_{B2}$, then the join result tuples are joined with $AR_{C2}$ (2) $T_A$ is joined with $AR_{B2}$, then the join result tuples are joined with $AR_{C1}$ (3) $T_A$ is joined with $AR_{C1}$, then the join result tuples are joined with $AR_{B1}$ (4) $T_A$ is joined with $AR_{C1}$, then the join result tuples are joined with $AR_{B2}$ The auxiliary relation method for maintaining the materialized view may likewise be performed with any number of base relations.

Aggregate Join View Extension

Another widely used materialized view is known as an aggregate join view. An aggregate join view is a join view that specifies some aggregate operations. An example of an aggregate join view AJV for relations A and B on join attributes A.c and B.x is as follows:

```
create join view AJV as
  select A.e, sum (B.z)
  from A, B
  where A.c=B.x
  group by A.e
  partitioned on A.e;
```

In one embodiment, the auxiliary relation method described above may be used to maintain aggregate join views.

The various nodes and systems discussed each includes various software layers, routines, or modules. Such software layers, routines, or modules are executable on corresponding control units. Each control unit includes a microprocessor, a microcontroller, a processor card (including one or more microprocessors or microcontrollers), or other control or computing devices. As used here, a "controller" refers to a hardware component, software component, or a combination of the two.

The storage devices referred to in this discussion include one or more machine-readable storage media for storing data and instructions. The storage media include different forms of memory including semiconductor memory devices such as dynamic or static random access memories (DRAMs or SRAMS), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines, modules, or layers in the various devices or systems are stored in respective storage devices. The instructions when executed by a respective control unit cause the corresponding node or system to perform programmed acts.

The instructions of the software layers, routines or modules are loaded or transported to the corresponding system in one of many different ways. For example, code segments including instructions stored on floppy disks, CD or DVD media, a hard disk, or transported through a network interface card, modem, or other interface device are loaded into the system and executed as corresponding software routines or modules. In the loading or transport process, data signals that are embodied in carrier waves (transmitted over telephone lines, network lines, wireless links, cables, and the like) may communicate the code segments, including instructions, to the system. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
   receiving a first tuple into a base relation at a first node of a parallel database system having plural nodes, wherein the first tuple comprises a join attribute and the base relation is partitioned across the nodes according to an attribute different from the join attribute;
   storing the first tuple in an auxiliary relation at a second node of the parallel database system, wherein the auxiliary relation is partitioned across the nodes of the database system according to the join attribute;
   identifying second tuples of a second relation;
   joining the first tuple with the second tuples based on the join attribute to produce join results; and
   storing the join results in a join view.

2. The method of claim 1, wherein storing the first tuple in an auxiliary relation at a second node comprises:
   determining that a join view definition excludes an attribute of the first tuple; and
   not storing the excluded attribute in the auxiliary relation.

3. The method of claim 1, further comprising:
   receiving a third tuple into the base relation;
   determining that a join view definition includes a condition on one of the attributes of the third tuple; and
   determining that the condition is not met by the one of the attributes of the third tuple; and
   not storing the second tuple in the auxiliary relation.

4. The method of claim 1, wherein joining the first tuple with the second tuples is performed at the second node.

5. An article comprising a medium storing instructions for execution by a processor-based system having plural nodes to:
   store a join view to store join results of a join of at least first and second base relations based on a join condition including a first attribute of the first base relation and a second attribute of the second base relation;
   receive a first tuple into the first base relation at a first node, wherein the first tuple comprises the first attribute and the first base relation is partitioned across the plural nodes according to an attribute other than the first attribute;
   store the first tuple in a first auxiliary relation at a second node, wherein the first auxiliary relation is partitioned across the plural nodes according to the first attribute;
   identify second tuples of the second base relation; and
   join the first tuple with the second tuples to produce join results for updating the join view.

6. The article of claim 5, further storing instructions for execution by the processor-based system to:
   compare the second attributes of the second tuples with the first attribute of the first tuple to produce the join results for updating the join view.

7. The article of claim 5, further storing instructions for execution by the processor-based system to:
   determine that a join view definition excludes an attribute of the first tuple; and
   not store the excluded attribute in the first auxiliary relation.

8. The article of claim 5, further storing instructions for execution by the processor-based system to:
   determine that a join view definition includes a condition on one of the attributes of the first base relation; and
   identify the one attribute in a received third tuple;
   determine that the condition is not met by the received third tuple; and
   not store the received third tuple in the first auxiliary relation.

9. The article of claim 5, wherein the processor-based system comprises plural storage modules, the first base relation partitioned across the storage modules according to the attribute other than the first attribute, and
   the first auxiliary relation partitioned across the storage modules according to the first attribute.

10. The article of claim 9, wherein the plural nodes contain the storage modules and plural processors, wherein the instructions when executed cause the processor-based system to further distribute the first tuple from the first node to the second node.

11. The article of claim 10, wherein the instructions when executed cause the processor-based system to further:
- store a second auxiliary relation containing one or more tuples of the second base relation;
- partition the second auxiliary relation across the storage modules according to the second attribute; and
- partition the second base relation across the storage modules according to an attribute of the second base relation other than the second attribute.

12. The article of claim 11, wherein identifying the tuples of the second base relation comprises identifying the tuples of the second auxiliary base relation, and wherein joining the first tuple with the second tuples comprises joining the first tuple with the second tuples of the second auxiliary relation.

13. The article of claim 5, wherein the join view stores join results of the join of the at least first and second base relations based on a query containing the join condition, wherein the instructions when executed cause the processor-based system to further determine whether the query specifies one or more elements that enable storage of less than the entire first base relation in the first auxiliary relation.

14. The article of claim 13, wherein the first auxiliary relation stores the entire first base relation in response to determining the one or more elements do not exist.

15. The article of claim 14, wherein the one or more elements comprise a selection condition in a WHERE clause of the query.

16. The article of claim 14, wherein the one or more elements comprise less than all of the attributes of the first base relation specified by a select clause in the query.

* * * * *